April 10, 1934.  B. B. KAHN  1,954,080
BROILER
Filed Aug. 3, 1931
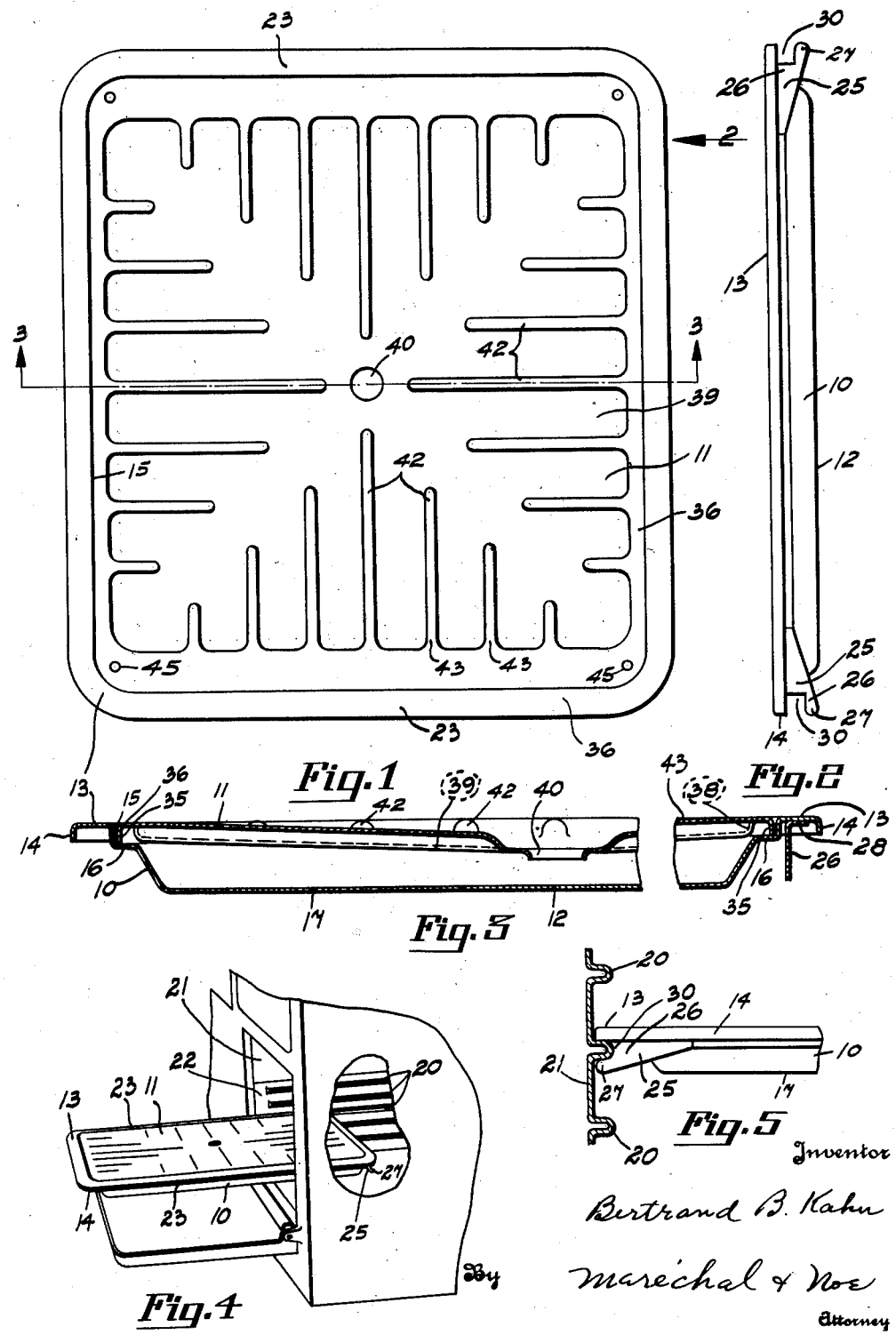

Patented Apr. 10, 1934

1,954,080

UNITED STATES PATENT OFFICE 1,954,080

BROILER

Bertrand B. Kahn, Cincinnati, Ohio, assignor to The Estate Stove Company, Hamilton, Ohio, a corporation of Ohio Application August 3, 1931, Serial No. 554,714

6 Claims. (Cl. 53—5)

This invention relates to stoves and more particularly to broiler pans for use therein.

One of the principal objects of the invention is the provision of an improved broiler pan which is of rugged construction, is easy to keep clean, has provision for collecting grease so that it will not ignite, and is simple and inexpensive to make.

Other objects and advantages of the invention will be apparent from the following description, the accompanying drawing and the appended claims.

In the drawing, which discloses a preferred embodiment of the invention—

Fig. 1 is a plan view of a broiler pan constructed in accordance with the present invention;

Fig. 2 is an end elevational view of the broiler pan shown in Fig. 1;

Fig. 3 is a sectional view taken on the line 3—3 of Fig. 1;

Fig. 4 is a view in perspective of a portion of a stove showing the broiler pan in use; and Fig. 5 is a fragmentary view showing the manner of supporting the broiler pan when in use.

The drawing, in which like characters of reference designate like parts throughout the several views thereof, illustrates a broiler pan which is slidably receivable within the broiling compartment of a stove for the support of steaks, chops, and the like which are to be cooked thereon. The broiler pan is fabricated from sheet metal and comprises two separable pieces, namely; a tray portion 10, and a plate 11 which is supported upon the tray portion.

The tray portion 10 of the broiler pan, which is shown to be rectangular in outline, comprises a depressed central portion 12 which is bounded by an elevated rim portion 13. The tray portion 10 is formed to provide a rigid support for the removable plate 11, and is shaped to receive this plate within the confines of the rim 13. As shown, the outer edge of the bounding rim 13 terminates in a downturned flange 14. The inner edge 15 of the rim 13, at the line of junction with the depressed pan portion 12, is formed into a seat 16 upon which the outer edge of the plate 11 is adapted to rest. The depth of the depressed pan 12, as defined by the height of the seat 16 from the bottom wall 17 of the portion 12, provides a drainage reservoir of sufficient capacity to receive grease and meat juices which drain thereinto from the rack plate during the cooking process.

The pan depth, although of sufficient capacity to receive the drainage from articles cooked upon the broiler pan, is relatively shallow with respect to its length and width so that in order to retain the drainage liquid and prevent it from being spilled when the broiler pan is moved, it is necessary that the pan should be supported in a substantially horizontal plane at all times that it is in use. The pan is freely slidable within the broiling compartment and is constructed so that it will stand self supported while partially withdrawn for the inspection of or the removal of articles being cooked thereon. The broiler pan is supported within the broiling compartment 21 of the stove by provision of vertically spaced pairs of horizontally related rails which project from the side walls 22 of the compartment as indicated at 20 in Fig. 4. These pairs of rails are spaced apart horizontally so as to receive the side portions 23 of the pan rim 13, and are spaced apart vertically to permit insertion of the broiler pan upon whichever pair of rails provides the proper spacing of the article to be cooked from the broiler flame above.

In order to permit the broiler pan to be partially withdrawn from the broiling compartment and to stand in such position self-supported in a substantially horizontal plane, one end of the pan is provided with oppositely extending fingers 25 which are positioned to underlie the rails upon which the rim portions 23 of the pan rest. As shown, the fingers 25 are formed of sheet metal, each comprising a vertically extending plate portion 26 having a projecting end 27 which terminates at a point vertically aligned with the rim edge 14 above it. Each plate portion 26 has formed as an integral part of it a horizontally extending flange 28 which serves for attachment of the finger to the underside of the rim 13 of the pan; the attachment being preferably made by welding the fingers thereon. The ends 27 of the attached fingers 25 are spaced from the rim portions 23 of the pan so as to form a groove 30 for passage of the outstanding rails 20 as the pan is inserted within the broiler compartment. The broiler pan is inserted within the broiling compartment with the fingers 25 at the entering end so that the fingers, which underlie the supporting rails 20 upon which the pan rests, will engage these rails when the pan is withdrawn a distance sufficient to cause it to become overbalanced so that it tends to fall by gravity from the rails. By being so supported the pan may be withdrawn an amount sufficient to turn steaks or chops supported thereon without it being necessary for the user to support the free end of the broiler pan, and without danger of the contents of the depressed pan portion 12 being spilled due to tilting of the broiler pan.

The plate 11, like the tray portion 10, is fabricated from sheet metal and is shaped to provide the necessary stiffness and rigidity for proper support of articles carried thereon. The bounding edge of the plate 11 is formed as a downturned flange 35 which extends from the elevated rim 36. The inner edge of the plate rim 36 is depressed, as indicated at 38, and this merges into a surface 39 which is inclined sufficiently to drain toward an aperture 40 provided in the center of the plate. The surface 39 is inclined an amount just sufficient to permit drainage of grease and meat juices toward the aperture 40 through which they flow into the depressed pan 12, and is flat enough for the proper support of articles which are to be cooked thereon. The inclination of the surface 39 is defined by four plane surfaces which extend inwardly and downwardly from each of the sides of the rim 36, and which intersect one another upon the diagonal lines extending from diagonally opposite corners of the rim.

To provide for proper support of articles and insure drainage toward the aperture 40 during broiling, and to permit the articles carried on the broiler pan to be readily removed, the surface 39 is provided with spaced embossed ribs 42 which project inwardly from the rim 36. The ribs 42 terminate short of the line of intersection of the adjacent inclined portions of the surface 39 by an amount sufficient to permit a free drainage path between the ribs of adjacent sides of the rim. The ribs 42 are preferably equal in height to the elevation of the rim 36 from the surface 39 so that the top edges 43 of the ribs 42 extend inwardly as a continuation of the rim 36. The upper portion of each embossed rib 42 presents a convex surface of considerable radius as compared to the depth of the rib. At the line of junction of the ribs with the surface 39 a larger radius curve is formed so that the ribs gradually merge into the surface 39. The contour of the embossed ribs is such that surfaces presented for contact with articles supported thereon stand either parallel with or at such an angle to the supported articles that they may be readily removed and, unlike the support provided by a wire rack, there are no spaces or surfaces wherein the supported articles may become caught to thereby make their removal difficult and annoying. All of the lines of intersection between adjoining surfaces of the rack plate are in the form of curves of sufficient radius to permit the plate to be readily cleaned.

The plate 11 serves in effect as a lid for the depressed pan portion 12 of the tray as it provides a complete closure therefor except for the drainage opening 40. By providing such a closed container for the reception of grease and meat juices, these liquids are protected sufficiently from the heat of the flame to prevent the temperature rising to a point which produces smoking and may cause ignition. As soon as the grease or meat juices seep from the article being cooked they flow along the inclined surface of the rack plate and fall into the closed container where they are retained until the completion of cooking. The contents of the closed container are readily accessible by merely lifting a side of the rack plate, and this may be readily accomplished by inserting the end of a fork or similar device within one of the holes 45 provided at each corner of the rim 36. The vertical height of the slot 30 is such that when the broiler pan is partially withdrawn it is permitted to be inclined downwardly at the front edge an amount sufficient to cause the liquid contents of the pan 12 to flow toward the front end thereof for removal.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. For use in a stove having a broiler compartment with broiler pan supporting means provided therein, a broiler pan comprising a tray having a depressed pan portion, and a plate receivable on the tray over the depressed pan portion, said plate having the major portion formed as flat surfaces inclined to direct drainage toward an aperture provided therein, and embossed ribs formed upwardly on each drainage surface of the plate and dividing the surface into flat areas each of which is of uniform width throughout the longitudinal extent of the bounding ribs.

2. For use in a stove having a broiler compartment with broiler pan supporting means provided therein, a broiler pan comprising a tray having a depressed pan portion, and a plate receivable on the tray over the depressed pan portion, said plate comprising a rim portion and inclined flat surfaces extending inwardly and downwardly from the rim, said plate surfaces merging on lines intersecting diagonally related rim corners, spaced ribs embossed on each surface and extending perpendicularly to the rim portion of the surface, said ribs being formed upwardly and terminating short of the line of merging of the surface, said plate having provision of drainage adjacent the junction of said surfaces.

3. For use in a stove having a broiler compartment with broiler pan supporting means provided therein, a broiler pan comprising a tray having a depressed pan portion, and a plate receivable on the tray over the depressed pan portion, said plate comprising a rim portion and inclined flat surfaces extending inwardly and downwardly from the rim, said plate surfaces merging on lines intersecting diagonally related rim corners, a group of similarly patterned embossed ribs formed upwardly on each of said surfaces, said ribs of each surface extending perpendicularly to the rim of that surface and terminating with a spacing between similar ribs of adjacent groups equal to the spacing of adjacent ribs of a group.

4. For use in a stove having a broiler compartment with broiler pan supporting means provided therein, a broiler pan comprising a reservoir and an overlying plate portion, said plate portion having flat surfaces inclined to direct drainage toward an aperture formed therein and above said reservoir, spaced ribs embossed upwardly on said plate portion, said ribs having curved upper portions formed to a radius of the order of the rib elevation and being spaced apart to afford intervening flat surfaces substantally wider than a rib width.

5. For use in a stove having a broiler compartment with broiler pan supporting means provided therein, a broiler pan comprising a tray having a depressed pan portion and a rectangular plate receivable on the tray over the depressed pan portion, said plate comprising a rim portion and flat surfaces inclined to direct drainage toward an aperture therein, embossed ribs formed upwardly on the flat surfaces and extending inwardly from the rim portion, said ribs being formed of a continuously curving contour having a radius substantially equal to the elevation of the rib top surface above the plate surface, the ribs being spaced to afford intervening flat surfaces substantially wider than a rib width.

6. For use in the broiling compartment of a stove having horizontally related rails, a broiler pan slidably receivable on said rails, said broiler pan comprising a tray having a depressed pan portion and laterally extending means above the bottom of the pan portion adapted to overlie and to rest upon the supporting rails for a sliding support of the pan thereon, and underlying rail engaging means extending laterally from the rear end of the pan for support of the pan in a substantially horizontal position when the pan is partly withdrawn on the rails, said underlying rail engaging means terminating at or above the level of the bottom of the pan whereby the pan may be rested upon a flat surface without interference from the underlying rail engaging means.

BERTRAND B. KAHN.